United States Patent [19]

Zimmerman

[11] 4,265,755

[45] May 5, 1981

[54] MAGNETIC FLUID TREATING UNIT

[75] Inventor: George M. Zimmerman, San Gabriel, Calif.

[73] Assignee: Bon Aqua, Inc., Rancho, Calif.

[21] Appl. No.: 68,754

[22] Filed: Aug. 23, 1979

[51] Int. Cl.³ .......................... B01D 35/06; B03C 1/30
[52] U.S. Cl. ..................................... 210/222; 210/232
[58] Field of Search ...................... 210/222, 223, 42 S, 210/232

[56] References Cited

U.S. PATENT DOCUMENTS

| | | | |
|---|---|---|---|
| 2,652,925 | 9/1953 | Vermeiren | 210/222 |
| 2,825,464 | 3/1958 | Mack | 210/222 |
| 3,170,871 | 2/1965 | Moriya | 210/222 |
| 3,186,549 | 6/1965 | Botstiber | 210/222 |
| 3,228,878 | 1/1966 | Moody | 210/222 |
| 3,511,776 | 5/1970 | Avampato | 210/222 |
| 3,567,026 | 3/1971 | Kolm | 210/222 |
| 3,608,718 | 9/1971 | Aubrey, Jr. et al. | 210/222 |
| 4,025,432 | 5/1977 | Nolan et al. | 210/222 |
| 4,148,731 | 4/1979 | Brigante | 210/42 S |
| 4,188,296 | 2/1980 | Fujita | 210/222 |

FOREIGN PATENT DOCUMENTS 1963700 12/1969 Fed. Rep. of Germany ........... 210/222
1416922  9/1965 France ................................... 210/42 S Primary Examiner—Benoît Castel
Attorney, Agent, or Firm—William P. Green

[57] ABSTRACT

A magnetic water treating device including a housing part containing a permanent magnet assembly with pole pieces positioned to contact the outside of a conduit, and having a flux return plate within the housing part at an outer side of the magnet assembly and spaced therefrom by a nonmagnetic part. A pair of end plates at opposite ends of the magnet assembly desirably extend through openings in the nonmagnetic part into engagement with the flux return plate. Projections on the nonmagnetic part extend inwardly for locating the elements of the magnet assembly, and connector posts projecting from the nonmagnetic part may extend through apertures in a second nonmagnetic part at the inner side of the magnet assembly to secure these parts together. The flux return plate may be retainable in the housing by reception of an edge portion thereof behind a locating shoulder. A second housing part may carry a resilient structure for exerting yielding force against an opposite side of the conduit.

30 Claims, 8 Drawing Figures

U.S. Patent May 5, 1981 Sheet 1 of 2 4,265,755
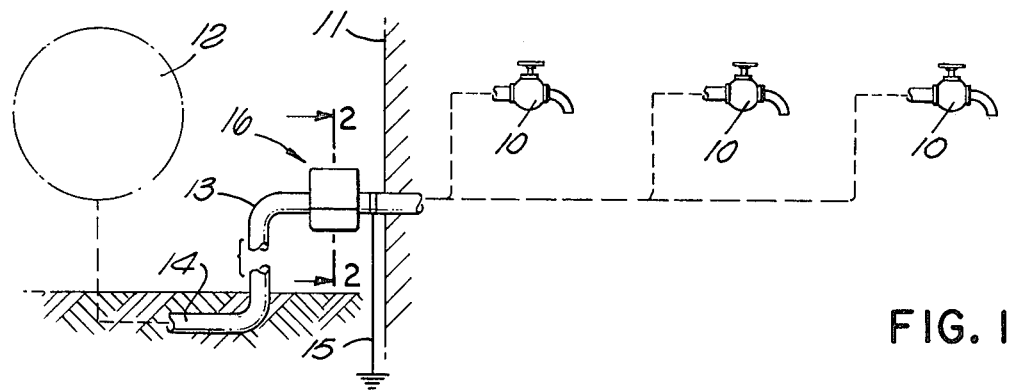
FIG. 1
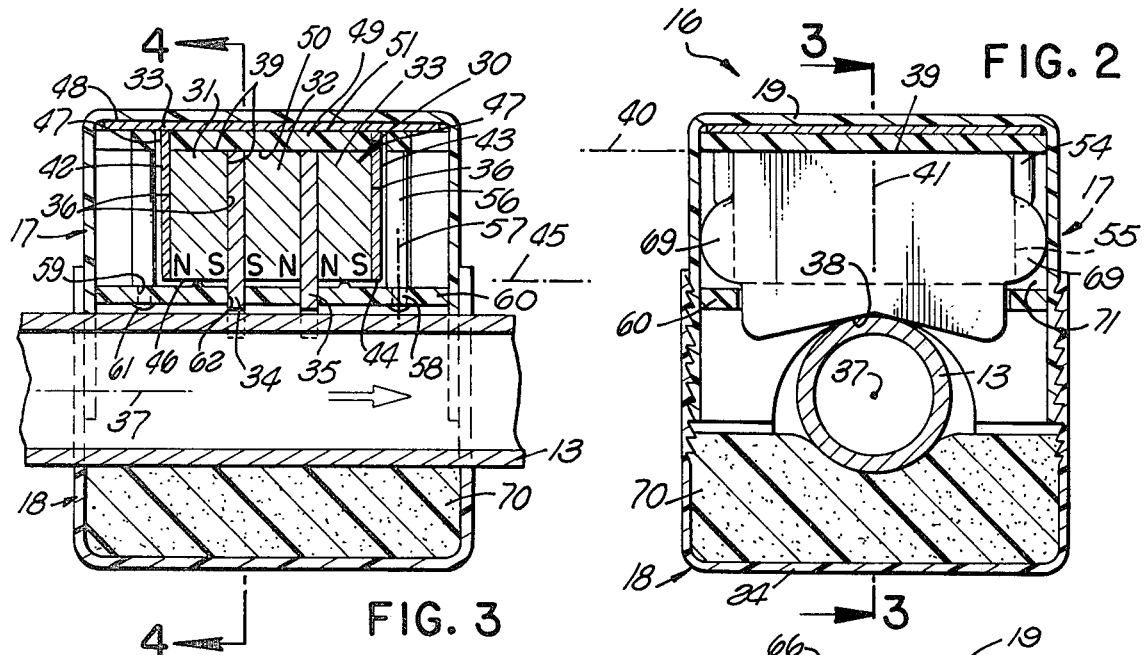
FIG. 2
FIG. 3
FIG. 4
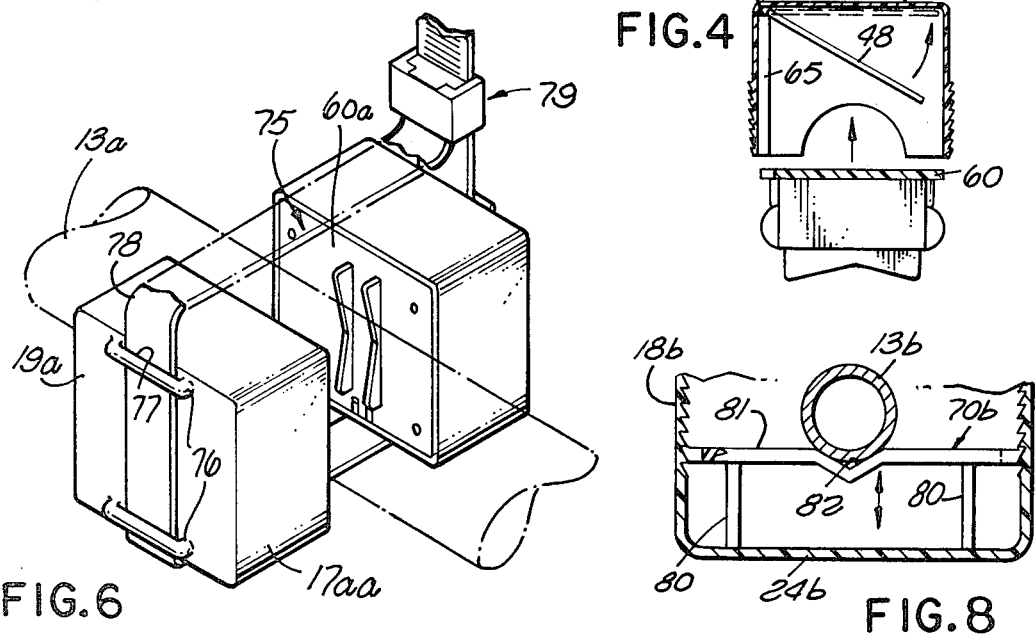
FIG. 6
FIG. 8

MAGNETIC FLUID TREATING UNIT

BACKGROUND OF THE INVENTION

This invention relates to improved magnetic units for treating a fluid within a conduit. The invention has been devised primarily for use in treating fresh water, and will be discussed mainly as applied to that use. However, it will be apparent that some of the structural features of the device disclosed in this application may also be applicable to magnetic devices for treating other fluids.

In U.S. patent applications Ser. No. 061,930 filed July 30, 1979 and Ser. No. 062,065 filed July 30, 1979, there has been disclosed a fluid treating device including a magnet assembly contained within a housing and adapted to be mounted to the outside of a water pipe or other conduit for magnetically affecting the contained fluid. The device of those prior inventions is effective to convert initially hard fresh water to a condition in which it will produce suds much more readily with a given amount of detergent or soap, and will otherwise have more of the characteristics of soft water. That prior device includes a magnet assembly having an overall effective south pole upstream of its overall effective north pole, and desirably consisting of three permanent magnets in a particular highly effective relationship for maximizing the strength of the poles. Each of the two pole pieces is preferably received between two of the three magnets, with a U-shaped flux return element engaging opposite ends of the assembly and having a return portion spaced outwardly from the magnets and pole pieces. A second housing part is received at the opposite side of the conduit and is connectable to the first mentioned magnet carrying part by interlocking teeth which detent the two housing parts against the pipe.

SUMMARY OF THE INVENTION

The general object of the present invention is to provide improvements in the above discussed type of magnetic fluid treating unit, and particularly structural improvements optimizing the interfitting relationship between the various parts of the assembly and assuring maintenance of those parts in an accurately predeterminable relation attaining a predictable magnetic strength and consequent fluid treating effect. Additionally, a device embodying the present invention can be more easily assembled than that shown in the prior applications, and can be assembled by less skilled personnel without adversely affecting the ultimate functional capability of the overall unit.

Certain of the advantages of the invention result from the manner in which the flux return elements of the magnet assembly are constructed and assembled. More particularly, the flux return parts may include a flux return plate received at an outer side of the magnet assembly and spaced from the magnet assembly by a nonmagnetic part containing apertures through which two ferromagnetic end plates received adjacent opposite ends of the magnet assembly project into engagement with the flux return plate. The latter plate and the two end plates then form together a U-shaped flux return structure, with all of the parts of that structure being accurately located by reception of the end plates within the discussed openings in the nonmagnetic part. The flux return plate may be retained in the housing of the device by reception of an edge of that plate behind a shoulder carrier by the housing, with the discussed nonmagnetic part being notched or cut away to recieve the shoulder structure and thereby permit insertion of that part into the housing without interference by the shoulder. Projections extending from the nonmagnetic part may engage and locate the elements of the magnet assembly, and connector posts projecting from the nonmagnetic part may be attached to and carry a second nonmagnetic part which extends across the inner side of the magnet assembly and contains openings through which the pole pieces of that assembly project.

A second housing part at the opposite side of the conduit preferably contains a resilient cushioning structure, for exerting yielding force against the conduit in a manner holding the pole pieces in effective contact therewith. The cushioning structure may be a body of foam material, or a specially formed conduit contacting resilient plastic part, or any other resilient structure serving the desired purpose.

BRIEF DESCRIPTION OF THE DRAWINGS

The above and other features and objects of the invention will be better understood from the following detailed description of the typical embodiments illustrated in the accompanying drawings in which:

FIG. 1 is a diagrammatic representation of a water supply system having a device of the present invention applied thereto;

FIG. 2 is an enlarged vertical transverse section taken on line 2—2 of FIG. 1;

FIG. 3 is an axial section taken on line 3—3 of FIG. 1, with the section line for FIG. 2 being shown at 2—2 on this figure;

FIG. 4 is a section taken on line 4—4 of FIG. 3;

FIG. 6 is a perspective representation of a variational form of the invention;

FIG. 8 is a view similar to a portion of FIG. 2, but showing the FIG. 7 cushioning element in use.

DESCRIPTION OF THE PREFERRED EMBODIMENTS

Figure 5:
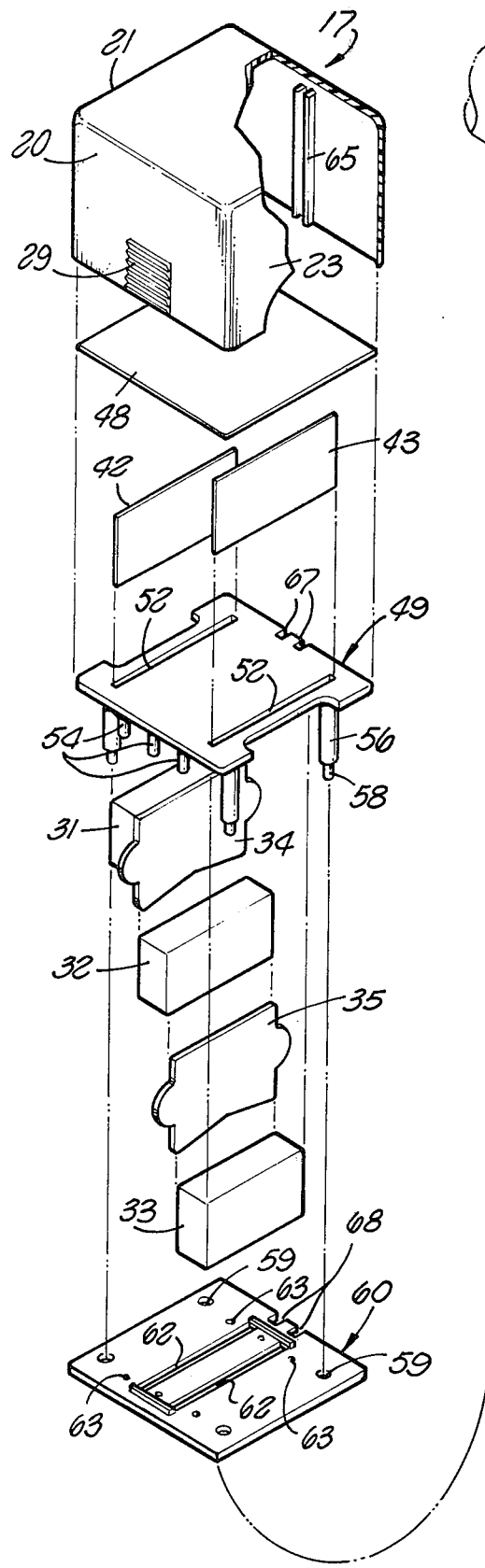
FIG. 5 is an exploded perspective view of the entire assembly.
Figure 5:
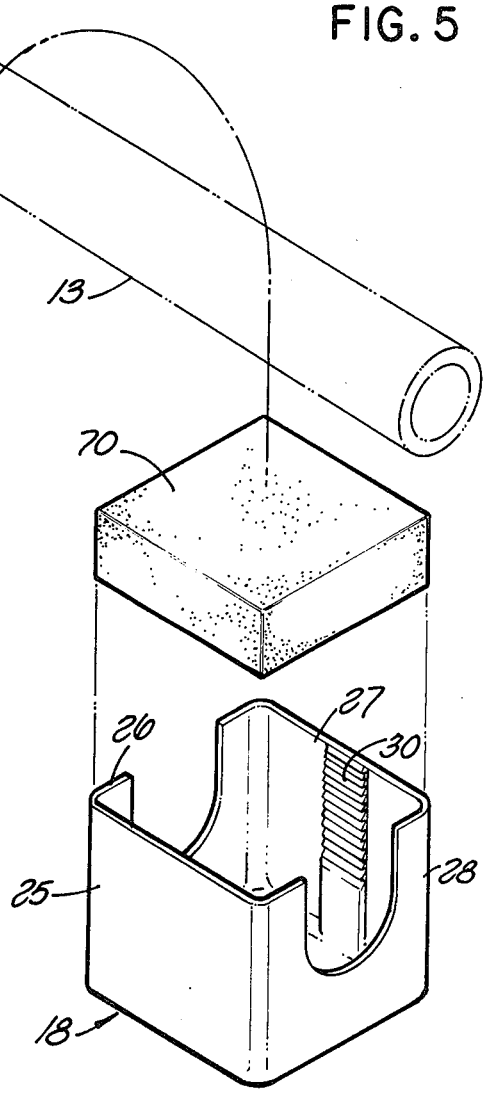

FIG. 1 illustrates diagrammatically a fresh water distribution system, including typically a number of faucets or other water outlets 10 contained within a building 11 and supplied with fresh water from a suitable pressurized source illustrated diagrammatically at 12. Water is delivered into the building through an electrically conductive metal pipe 13, typically conventional galvanized steel pipe, which is grounded by extension through the earth at 14 and preferably also by a direct ground connection from the pipe represented at 15. The water is treated before entering the building by a magnetic device 16 constructed in accordance with the invention and represented in greater detail in FIGS. 2 to 5.

The water treating unit 16 includes two housing parts 17 and 18 preferably molded of a suitable nonmagnetic and nonelectrically conductive resinous plastic material, such as a slightly resiliently deformable polyethylene. Housing part 17 is an essentially rectangular box having one open side, and being defined by a typically square outer or back wall 19 and four side walls 20, 21, 22 and 23 perpendicular to outer wall 19 and defining together a square recess into which the magnet parts are insertable. A second housing part 18 is of similar rectangular box-like configuration, having a square outer or back wall 24 and four perpendicular side walls 25, 26, 27 and 28 defining a square recess into which the side walls of the first housing part 17 are slidably receivable in the interfitting relationship illustrated in FIGS. 2 and 3 to form together an enclosure encircling conduit 13. Two sets of detenting teeth 29 on the outer surfaces of side walls 20 and 22 of housing part 17 are engageable in any of various different positions with teeth 30 formed in the inner surfaces of side walls 25 and 27 of part 18 to hold the two housing parts together in a position in which they effectively grip the pipe as seen in FIG. 2. The housing part walls which carry the two sets of teeth are slightly resiliently deformable to enable the teeth to slip past one another as the housing parts are moved into interfitting relation, with the teeth then being forced yieldingly into interlocking engagement in whatever position the housing parts ultimately assume to detent or lock the parts against axial separation from one another in that fully assembled condition.

Housing part 17 contains a permanent magnet assembly 30, including three identical rectangular magnetic blocks 31, 32 and 33, and two pole pieces 34 and 35 formed of an appropriate ferromagnetic material such as a suitable cadmium plated mild steel. The magnets 31, 32 and 33 may be formed of a ceramic magnet composition. Each of the magnets 31, 32 and 33 has two rectangular pole faces 36 lying in parallel planes disposed perpendicular to the main axis 37 of conduit 13 and the treating device 16. Assuming that the fluid being treated flows to the right in FIG. 3, the poles of the three magnets are in the orientation designated in that figure, with the south pole of central magnet 32 being at its left-hand or upstream side, and the north pole of that magnet being at its right-hand or downstream side. The poles of the other two magnets 31 and 33 are reversed with respect to central magnet 32, so that the south poles of magnets 31 and 32 face one another and the north poles of magnets 32 and 33 face one another, to thereby give pole piece 34 a strong south polarity, and pole piece 35 a strong north polarity. The two pole pieces 34 and 35 project radially inwardly beyond the magnets 31, 32 and 33, with each of the pole pieces having the outline configuration represented in FIG. 2, to present at their radially inner ends shalow V-shaped recesses 38 adapted to engage any of different diameters of conduit.

At their radially outer sides, the magnets 31, 32 and 33, and the pole pieces 34 and 35, all have outer planar surfaces 39 lying in a common plane 40 parallel to axis 37 and perpendicular to a radius 41 extending from axis 37 to plane 40. Adjacent the north pole face of magnet 31 and the south pole face of magnet 30, there are provided two flat end plates 42 and 43 formed of an appropriate ferromagnetic material such as cadmium plated mild steel. These plates 42 and 43 have inner edges 44 lying in a plane 45 which is parallel to plane 40 and which also contains the inner edges or faces 46 of the magnets. Plates 42 and 43 are rectangular and coextensive with the engaged surfaces of the magnets except that the two plates 42 and 43 have portions projecting radially outwardly at 47 beyond the radially outer faces 39 of the magnets and pole pieces.

Adjacent the outer wall 19 of housing part 17, there is provided a flat flux return path plate 48, which is square and dimensioned to fit closely within the square recess in housing part 17, and which is disposed parallel to plane 40. Plate 48 may be formed of a suitable ferromagnetic sheet material, such as cadmium plated mild steel. Interposed between plate 48 and the surfaces 39 of the three magnets and the pole pieces 34 and 35 there is provided a flat part 49 formed of a nonmagnetic material, desirably a resinous plastic material such as polyethylene. Part 49 has parallel planar inner and outer surfaces 50 and 51, the former of which is contacted by outer surfaces 39 of parts 31, 32, 33, 34 and 35, while the outer surface 51 contacts and abuts against the flat flux return plate 48. Part 49 contains two elongated parallel slits 52 through which end plates 42 and 43 project radially outwardly, with those plates having outer straight edges 53 contacting and extending along the surface of flux return plate 48 to form with that plate a U-shaped return path between plates 42 and 43. The plates are confined fairly closely within slits 52 in a manner locating the plates by such reception in those slits, and thereby locating the entire magnet assembly relative to part 49.

As seen in FIGS. 2 and 5, the molded plastic part 49 has three parallel projections 54 at each of two opposite ends of the magnet assembly, to engage the parallel opposite end surfaces 55 of each of the magnets in a relation locating the magnets against left to right movement as viewed in FIG. 2. As will be apparent, the projections 54 extend perpendicular to planar surfaces 50 and 51 of part 49, and may typically be cylindrical.

There also are formed integrally with part 49 four parallel typically cylindrical connector posts 56, extending along axes 57 perpendicular to surfaces 50 and 51 of part 49, and having reduced diameter extremities 58 projecting through openings 59 in a flat forward or inner part 60 at the radially inner side of the magnet assembly. The polyethylene or other resinous plastic material forming posts 57 may initially be molded to a condition forming reduced diameter portions 58 of uniform diameter to their extremities. After the parts have been asssembled with the reduced diameter portions extending through apertures 59, the extremities of the portions 58 may be heated by a soldering iron or the like to form enlargements or heads 61 at the radially inner side of part 60 for effectively locking part 60 on the posts 56. Part 60 has two parallel elongated slits 62 through which pole pieces 34 and 35 project radially inwardly for contact with conduit 13. At the radially outer side of element 60, that part may have short projections or lugs 63 engageable with the magnets and pole pieces to hold them in slightly spaced relation to the remainder of part 60 as shown in FIG. 3.

In assembling the various parts within housing element 17, the flux return plate 48 is first positioned against wall 19 and retained against that wall by interfitting engagement with a pair of ribs 65 carried by and projecting from wall 22 of part 17. These ribs are parallel to one another, and extend parallel to the radial line 41 of FIG. 2, and at their radially outer extremities terminate in a pair of end edges 66 (FIG. 4) defining shoulders parallel to wall 19 and spaced therefrom a distance just slightly greater than the thickness of plate 48. Plate 48 may thus be positioned in the housing in the manner illustrated in FIG. 4, by first inserting the plate to a location in which its left edge as viewed in that figure is received within the gap formed between shoulders 66 and wall 19, following which the plate 48 may be swung upwardly from the full line position of FIG. 4 to the broken line position of that figure. After plate 48 has thus been positioned in housing part 17, the rest of the magnet assembly, including parts 31, 32, 33, 34, 35, 42, 43, 49, and 60, all pre-assembled and secured together, may then be inserted into the housing and into engagement with plate 48. To pass the assembled parts into such a position, the two plastic parts 49 and 60 contain aligned pairs of notches 67 and 68 (FIG. 5), dimensioned and positioned to receive and interfit with ribs 65 and allow the entire assembly to be inserted into housing part 17 by movement along axis 41 relative to that housing part. When the magnet assembly reaches a position of engagement with the previously inserted plate 48, the attraction of the magnets for that plate will effectively retain plate 48 parallel to plastic parts 49 and 60 of the magnet assembly, and in that parallel position the reception of the edge of plate 48 behind shoulders 66 will act to lock all of the parts in place. The positioning of the pole pieces 34 and 35 within that housing is further controlled by engagement of a pair of end lugs 69 on each of the pole pieces with two of the side walls of part 17.

The second housing part 18 contains a cushioning element 70 (FIGS. 2 and 3), which contacts the conduit at a side opposite the magnets, and which is resiliently deformable to exert a yielding force against the conduit in a manner clamping it lightly but effectively between cushion 70 and the pole pieces 34 and 35. Cushioning part 70 may be a rectangular block of appropriate resiliently deformable foam material, such as a suitable plastic foam.

Desirably, all of the otherwise unoccupied spaces in housing part 17, upwardly beyond part 60 as viewed in FIGS. 2 and 3, are filled with a suitable non-magnetic and electrically insulative potting material, as represented at 71 in the figures. This potting material may be a resinous plastic material and applied by positioning housing part 17 with its open end facing upwardly, then pouring the potting material in liquid form into that housing part prior to insertion of the magnet assembly into the housing, and then moving the entire magnet assembly including the plastic parts, etc. downwardly into the potting material, allowing the latter to fill the spaces about the magnets and other parts up to the level of plastic element 60, and ultimately allowing the plastic material to harden in place in the housing. The amount of potting material initially filled into the housing may be pre-measured to just occupy the spaces within the assembly without overflowing past part 60.

In using the device of FIGS. 1 to 5, housing part 17 is placed against the outside of conduit 13 in an orientation in which the poles will be located as illustrated in FIG. 3 relative to the direction of fluid flow. The second housing part is then positioned on the opposite side of the conduit and the two housing elements are moved together until they properly clamp the conduit therebetween, with the teeth 29 and 30 snapping past each other until that desired condition is reached, and with the teeth then effectively detenting the housing parts against axial separation from the assembled condition. As water flows through the conduit, the effect of the magnetic polarity applied to the pipe by virtue of contact of pole pieces 34 and 35 therewith is to improve the condition of the water as previously discussed.

FIG. 6 shows a variational arrangement including two housing parts 17a and 17aa which may be essentially the same as part 17 of FIGS. 1 to 5, and each contain an assembly 75 identical with the assembly contained within part 17 of FIGS. 1 to 5. More particularly, the assembly 75 includes all of the magnets, pole pieces, ferromagnetic plates and plastic elements 49 and 60 of FIGS. 1 to 5, but with the housing not projecting beyond the plate 60a (corresponding to plate 60 of FIG. 3), but instead terminating essentially in the plane of the exposed surface of part 68. The outer wall 19a of each of the housing elements 17a has integrally formed thereon two projections 76 containing elongated slits 77 through which a strap or clamp 78 may extend for retaining two or more of the housing parts 17a and contained parts at different locations about a conduit 13a. That is, a single strap may be passed through the slits 77 of any number of the units, and then after encircling the conduit and units have its ends connected together at 79 to retain the units on the pipe.

Figure 7:
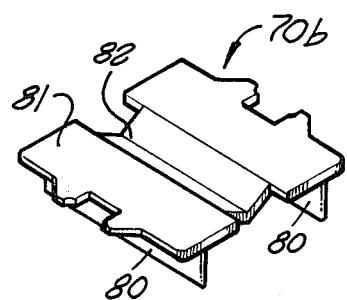
FIG. 7 is a perspective view of a variational type of cushioning element.

FIGS. 7 and 8 show fragmentarily a variational arrangement which is similar to that of FIGS. 1 to 5 except for the substitution of a different type of cushioning element 70b in lieu of the foam type cushion 70. The part 70b is molded to the configuration illustrated in FIG. 7, and may be formed of a suitable resinous plastic material such as a slightly resiliently deformable polyethylene, and may have two parallel ribs or projections 80 engageable with the outer wall 24b of housing part 18b (corresponding to part 18 of FIGS. 1 to 5). A wall 81 extends across or bridges the space between the two legs or ribs 80, and has a central portion shaped to provide a shallow V-section groove 82 adapted to partially receive and embrace and locate a conduit 13b as the two housing parts are tightened together in the manner of parts 17 and 18 of FIGS. 1 to 5. The material of wall 81 is sufficiently deformable and resilient to be deflectable slightly downwardly as the housing parts are moved together, and thus exert upward yielding force against the conduit 13b for clamping the conduit effectively between wall 81 and the pole pieces 34 and 35 of the main magnet assembly contained within housing 17 of the first form of the invention.

While certain specific embodiments of the present invention have been disclosed as typical, the invention is of course not limited to these particular forms, but rather is applicable broadly to all such variations as fall within the scope of the appended claims.

I claim:

1. A liquid treating device comprising:
    a permanent magnet structure adapted to be received adjacent a conduit through which liquid to be treated is flowing;
    a flux return plate of ferromagnetic material at an outer side of said magnet structure;
    a part formed of nonmagnetic material interposed between and spacing apart said magnet structure and said flux return plate and having portions projecting in opposite directions beyond said magnet structure and containing openings; and
    two end plates of ferromagnetic material received adjacent opposite end faces of the magnet structure and extending through said openings respectively in said part of nonmagnetic material to said flux return plate.

2. A device as recited in claim 1, in which said openings in said part formed of nonmagnetic material are two elongated parallel slits receiving said end plates respectively.

3. A device as recited in claim 1, in which said part formed of nonmagnetic material has projections extending therefrom at a side of the magnet structure for locating the magnet structure relative to said part.

4. A device as recited in claim 1, in which said permanent magnet structure includes a plurality of permanent magnet blocks disposed essentially parallel to one another, said part formed of nonmagnetic material having projections extending therefrom at each of two opposite ends of each magnet block to locate the magnet assembly relative to said part.

5. A device as recited in claim 1, including a second part of nonmagnetic material extending across an inner side of said permanent magnet structure, and connector posts extending between said two parts of nonmagnetic material and securing them together.

6. A device as recited in claim 1, including a second part formed of nonmagnetic material and extending across an inner side of said permanent magnet structure generally parallel to said first mentioned part of nonmagnetic material, said first part of nonmagnetic material having a plurality of posts formed of such material and projecting inwardly therefrom and into apertures in said second part of nonmagnetic material to secure said two parts together.

7. A device as recited in claim 6, in which said posts have portions projecting beyond said second part of nonmagnetic material and forming heads larger than said apertures to retain the two parts of nonmagnetic material together.

8. A device as recited in claim 1, including a second part formed of nonmagnetic material and extending across an inner side of said magnet structure, said magnet structure having pole pieces projecting through openings in said second part of nonmagnetic material to an inner side thereof.

9. A device as recited in claim 1, including a housing containing said magnet structure and said flux return plate and said part formed of nonmagnetic material and said end plates, said housing having an outer wall near which said flux return plate is received.

10. A device as recited in claim 1, including a housing containing said magnet structure and said flux return plate and said part formed of nonmagnetic material and said end plates, said housing having a shoulder engageable by said flux return plate at one edge thereof in a relation retaining the plate at that location against withdrawal from the housing, said part formed of nonmagnetic material being cut away at the location of said shoulder to be insertable therepast and into engagement with the flux return plate after the latter has been positioned in the housing.

11. A device as recited in claim 1, including a housing containing said flux return plate and said magnet structure and said part of nonmagnetic material and said end plates and having an outer wall adjacent which the flux return plate is received, said housing having a side wall extending inwardly from said outer wall and provided with two essentially parallel ribs spaced from the outer wall for reception of an edge portion of said flux return plate between said ribs and said outer wall, with said ribs having shoulders formed at ends thereof blocking withdrawal of an engaged portion of the flux return plate from the housing, said part formed of nonmagnetic material containing two slots shaped to receive said two ribs in a relation permitting movement of said part of nonmagnetic material into the housing without interference by the ribs.

12. A device as recited in claim 11, including a second part formed of nonmagnetic material extending across an inner side of said permanent magnet structure and receivable in the housing and containing slots for receiving and interfitting with said ribs.

13. A device as recited in claim 1, including a second part formed of nonmagnetic material extending generally parallel to said first part of nonmagnetic material and across an inner side of said magnet assembly, said magnet assembly including three permanent magnet blocks and two ferromagnetic pole pieces each received between a pair of said blocks and projecting inwardly beyond the permanent magnet blocks and through openings in said second part of nonmagnetic material to an inner side thereof.

14. A device as recited in claim 13, including a housing containing said permanent magnet structure and said flux return plate and said two parts of said nonmagnetic material and said end plates and having an outer wall adjacent which the flux return plate is received and side walls projecting therefrom.

15. A device as recited in claim 14, in which said first part formed of nonmagnetic material has posts of such material projecting therefrom through apertures in said second part formed of nonmagnetic material and having heads at an inner side of said second part larger than said apertures.

16. A device as recited in claim 15, in which said first part formed of nonmagnetic material has projections extending inwardly therefrom at opposite ends of each of said magnet blocks to locate the blocks.

17. A device as recited in claim 16, in which one of said side walls of the housing has at least one shoulder structure engageable with an edge portion of said flux return plate in a relation retaining the flux return plate at that location against movement away from the outer wall of the housing, said two parts of nonmagnetic material being notched to receive said shoulder structure and move into the housing without interference by the shoulder structure.

18. A device as recited in claim 1, including a housing to be received at a side of said conduit and containing said magnet structure and having at least one slit formed in an outer portion of said housing, and a strap extending about the conduit and through said slit for retaining said housing and contained magnet against the conduit.

19. A liquid treating device comprising:
a housing having an outer wall and side walls projecting inwardly therefrom;
a magnet structure contained in said housing and adapted to be received adjacent a conduit through which liquid to be treated is flowing; and
a flux return plate of ferromagnetic material received in the housing near said outer wall thereof;
said housing having a projection forming a shoulder facing toward said outer wall of the housing and spaced therefrom to provide a gap within which an edge portion of said flux return plate is received between the shoulder and outer wall of the housing in a relation retaining that portion of the plate against movement away from said outer wall.

20. A device as recited in claim 19, including a part formed of nonmagnetic material interposed between said magnet structure and said flux return plate and cut away at the location of said projection to permit insertion of said part into the housing adjacent the flux return plate without interference by the projection.

21. A device as recited in claim 19, including two parts of nonmagnetic material extending across outer and inner sides respectively of said permanent magnet structure and both being notched to receive said projection for insertion of said parts into the housing without interference by the projection.

22. A liquid treating device comprising:
a permanent magnet structure adapted to be received adjacent a conduit through which liquid to be treated is flowing;
a flux return plate at an outer side of said permanent magnet structure;
a first part formed of nonmagnetic material interposed between said permanent magnet structure and said flux return plate and projecting laterally therebeyond;
a second part formed of nonmagnetic material extending across an inner side of said permanent magnet structure in spaced relation to said first part;
said first part of nonmagnetic material having posts formed of such material extending inwardly into openings in said second part to secure the two parts together.

23. A device as recited in claim 22, in which said posts have heads beyond and larger than said openings to retain said two parts together.

24. A liquid treating device comprising:
a housing:
a permanent magnet structure within said housing; and
a part molded of nonmagnetic material and extending across an inner side of said housing inwardly of said magnet structure;
said magnet structure having pole pieces projecting through openings in said part formed of nonmagnetic material to the inner side thereof and adapted to be received adjacent a conduit through which liquid to be treated is flowing.

25. A liquid treating device comprising:
a housing;
a magnet structure contained in said housing and adapted to be received adjacent a conduit through which liquid to be treated is flowing;
a flux return plate in the housing at an outer side of said magnet structure;
a part formed of nonmagnetic material interposed between said magnet structure and said flux return plate and projecting laterally therebeyond;
said part formed of nonmagnetic material having projections of said material extending inwardly adjacent said permanent magnet structure to locate it relative to said part and the housing.

26. A device as recited in claim 25, in which said magnet structure includes a plurality of magnet blocks and intermediate pole pieces, said projections being engageable with opposite ends of each of said magnet blocks.

27. A liquid treating device comprising:
a first housing part to be received at one side of a conduit through which liquid flows and containing a magnet structure adapted to be received adjacent a conduit through which liquid to be treated is flowing;
a second housing part to be received at the opposite side of the conduit and connectable to said first housing part; and
a cushioning structure carried by said second housing part for exerting yielding force against the conduit.

28. A device as recited in claim 27, in which said cushioning structure is a resiliently compressable body of foam material exerting force against the conduit.

29. A device as recited in claim 27, in which said cushioning structure is a part molded of resiliently flexible resinous plastic material having legs engageable with said second housing part and having a wall extending between said legs for applying force to the conduit and resiliently deflectable between the legs to exert such yielding force.

30. A device as recited in claim 29, in which said wall contains a groove for receiving and embracing the conduit in locating relation.

* * * * *